United States Patent [19]

Ohta

[11] Patent Number: 4,986,633
[45] Date of Patent: Jan. 22, 1991

[54] MICROLENS AND PROCESS FOR PRODUCING SAME

[75] Inventor: Mitsuru Ohta, Nagoya, Japan

[73] Assignee: Brother Kogyo Kabushiki Kaisha, Japan

[21] Appl. No.: 243,714

[22] Filed: Sep. 13, 1988

[30] Foreign Application Priority Data

Sep. 22, 1987 [JP] Japan ............................... 62-238457
Sep. 22, 1987 [JP] Japan ............................... 62-238458

[51] Int. Cl.$^5$ .......................... B29D 11/00; G02B 1/04
[52] U.S. Cl. ..................................... 350/167; 430/321; 350/320
[58] Field of Search ................. 350/167, 320; 430/321

[56] References Cited

U.S. PATENT DOCUMENTS 4,877,717 10/1989 Suzuki et al. ....................... 350/167

Primary Examiner—Bruce Y. Arnold
Assistant Examiner—Terry S. Callaghan
Attorney, Agent, or Firm—Oliff & Berridge

[57] ABSTRACT

A microlens having pliability is disclosed, which comprises a layer of a polymer composition having the thickness gradually changed, the layer of the polymer composition being formed by exposing to light a layer of a photo-reactive composition selected from (i) compositions containing a photopolymerizable monomer and a photopolymerizable initiator or (ii) compositions containing a photopolymerizable polymer. A process for producing the microlens is also disclosed.

3 Claims, 1 Drawing Sheet

MICROLENS AND PROCESS FOR PRODUCING SAME

FIELD OF THE INVENTION

The present invention relates to a microlens using a photo reactive composition and a process for producing the microlens.

BACKGROUND OF THE INVENTION

Hitherto, there have been known lenses having a small diameter of about 0.5 to 3.0 mm, such as a selfoc lens used in a copying machine and an optical fiber for optical comminucation, which have not been called microlens.

A selfoc lens is a hard lens exhibiting no pliability, and an optical fiber is not a plane lens though it has pliability. In the case of forming an image on an image receiving material, therefore, the original is not read as a whole at once but linearly, taking a long time to read the whole image of the original. Further, when an image on a curved surface of the original is formed on a plane surface, a hard lens such as a selfoc lens cannot form the image from all portions of the original. Furthermore, an image formation on a square surface using a tube shaped light source encounters the problem that the image at the periphery of the square surface becomes fuzzy.

SUMMARY OF THE INVENTION

Objects of the present invention are to produce a microlens capable of forming an image with good accuracy by a simple method and to provide a microlens having pliability.

These objects are attained by a microlens using a photo reactive composition, which is produced by exposing a layer of a photo reactive composition to light through a contact screen, developing and rinsing the thus light exposed layer.

That is, the present invention is a microlens comprising a layer of a polymer composition having the thickness gradually changed, the layer of the polymer composition being formed by exposing to light a layer of a photo reactive composition selected from (i) compositions containing a photopolymerizable monomer and a photopolymerization initiator, or (ii) compositions containing a photodecomposable polymer.

Another embodiment of the present invention is a process for producing a microlens, comprising exposing a layer of the photo reactive composition to light, developing and rinsing the layer.

Figure 1:
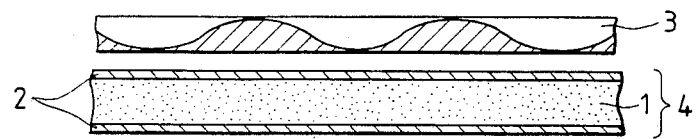
FIG. 1 shows a photopolymerizable sheet with a contact screen prior to light exposure.

In these figures, the numerals 1 and 1' are a layer of photopolymerizable composition and a layer of photodecomposable composition, respectively; 2 a PET film; 3 a contact screen; and 4 and 4' a photopolymerizable sheet and a photodecomposable sheet, respectively.

DETAILED DESCRIPTION OF THE INVENTION

The photo reactive composition used in the present invention is a photopolymerizable composition or a photodecomposable composition.

The photopolymerizable composition contains a photopolymerizable monomer and a photopolymerization initiator. The photopolymerizable monomer is a compound having at least one ethylenically unsaturated bond and includes monomers, prepolymers such as dimers, trimers and other oligomers, and mixtures or copolymers thereof. Examples of the photopolymerizable monomer include acrylic acid esters of polyhydric alcohols, urethane type acrylic acid esters, unsaturated esters of polybasic carboxylic acids, unsaturated acid amides, esters or metal salts of inorganic acids, monomers having an acetylenically unsaturated group, and monomers having a glycidyl group. Of those, acrylic acid esters represented by the following formula are preferred.

$$CH_2=CHCOOR$$

Preferred examples of the acrylic acid ester are monofunctional esters, e.g., 2 ethylhexyl acrylate, 2 hydroxyethyl acrylate and 2 hydroxypropyl acrylate; difunctional esters, e.g., 1,3 butanediol diacrylate, 1,4 butanediol diacrylate, 1,6 hexanediol diacrylate, diethylene glycol diacrylate, neopentyl glycol diacrylate, polyethylene glycol diacrylate (polymerization degree of polyethylene 400) and hydroxypivalic acid ester neopentyl glycol diacrylate; and tri or polyfunctional esters, e.g., trimethylolpropane triacrylate, pentaerythritol triacrylate, dipentaerythritol hexaacrylate and triallyl isocyanurate. These esters may be used as a mixture of two or more. Of these acrylic acid esters, difunctional esters are particularly preferred. Added to a solvent is from 3 to 50% by weight of photopolymerizable monomer, preferably from 5 to 30 wt %, and more preferably from 5 to 15 wt %, to thus provide the photopolymerizable composition.

The photopolymerization initiator, that accelerates polymerization of photopolymerizable monomers and functions as a sensitizing agent, generates radicals upon irradiation of active ray to initiate an addition polymerization reaction of compounds having an ethylenically unsaturated bond as described above. Preferred examples include carbonyl compounds, azo compounds, organic sulfur compounds, redox compounds (e.g. $Fe^{3+} \rightarrow Fe^{2+}$, $Fe^{2+} + H_2O_2 \rightarrow Fe^{3+} + HO\cdot + OH^-$), halogen compounds, light sensitive dyes (e.g. cyanine dye and riboflavin), alkyl metal compounds, metal carbonyl compounds, and the like, with carbonyl compounds having a ketone structure which generate radicals by light exposure being particularly preferred, e.g., acetophenone, benzophenone, Michler's ketone, benzil, benzoin, benzoin isobutyl ether, benzyl dimethyl ketal, 1-hydroxycyclohexyl phenyl ketone, 2-hydroxy-2-methyl-1-phenylpropan-1-one, 1,2-dihydroxy-2-methylpropan-1-one, azobisisobutyronitrile, benzoyl peroxide and di tert butyl peroxide. They may be used independently or as a mixture thereof. These photopolymerization initiators are capable of initiating the photopolymerization upon irradiation from a light source of UV region of 400 nm or less. Added to a solvent is from 1 to 15% by weight of photopolymerization initiator, preferably from 1 to 7 wt %, and more preferably from 1 to 2 wt %, to thus provide the photopolymerizable composition.

The photodecomposable composition which can be used as the other photo reactive composition of the present invention contains a light sensitive polymer capable of being decomposed upon irradiation of light in such a manner that the main chain of the polymer cleaves to form low molecular copolymers or oligomers. Compounds most effectively decomposed by light irradiation are polymers having a carbonyl structure introduced in its main chain. In general, ketone compounds undergo cleavage upon light irradiation as shown below.

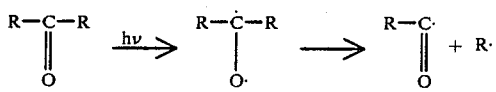

Examples of such a photodecomposable polymer used in the composition include copolymers of ketone compounds (e.g., methyl vinyl ketone, methyl isopropenyl ketone, ethyl vinyl ketone, t butyl vinyl ketone, etc.) and ethylene, styrene, vinyl chloride or the like; polyvinyl phenyl ketone; copolymers of carbon monooxide and styrene, vinyl chloride, an acrylate, ethylene or the like; and polysulfone, with copolymers of a carbonyl compound and methyl methacrylate being particularly preferred. Added to a solvent is from 3 to 50% by weight of photodecomposable polymer, preferably from 5 to 30 wt %, and more preferably from 5 to 15 wt %, to thus provide the photodecomposable composition. The photodecomposable composition may further contain a photodecomposition accelerator such as metal complexes of dialkyldithiocarbamates, stearic acid, salicylaldehyde, acetylacetone, benzophenone oxime, etc. Added to a solvent is from 1 to 15% by weight of photodecomposition accelerator, preferably from 1 to 7 wt %, and more preferably from 1 to 2 wt %, to thus provide the photodecomposable composition.

The photopolymerizable or photodecomposable composition of the present invention further contains a film forming resin such as phenol resins, urea resins, melamine resins, polyester resins, diallyl phthalate resins, epoxy resins, acrylic resins, methacrylic resins, and vinyl chloride resins. Of those, polymethacrylates represented by the following formula are particularly preferred.

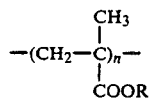

Added to a solvent in from 1 to 30% by weight of film forming resin, preferably from 1 to 10 wt %, and more preferably from 1 to 5 wt %, to thus provide the photopolymerizable or photodecomposable composition.

The photo reactive composition as described above is dissolved in a solvent and coated on a film of PET, polyethylene, etc. As the solvent, ketones (e.g., methyl isobutyl ketone, dimethyl ketone, methyl ethyl ketone, etc.), aromatic compounds (e.g., toluene, benzene, etc.), and compounds having at least two hydroxy groups (e.g., diethylene glycol, tetrahydrofurfuryl alcohol, etc.) are preferably used. A layer of photo reactive composition having a thickness of 10 to 50 μm is coated onto a PET film having a thickness of 12 to 50 μm.

Further, the photodecomposable composition is subjected to heating at a temperature of 140° to 160° C. for 10 to 15 minutes prior to light irradiation thereto in order to form a crosslinking structure between molecules in the photodecomposable composition.

A flexible microlens array has been achieved according to the present invention, i.e., by providing a layer of the photo reactive composition containing a film forming resin, exposing the layer to light through a contact screen to cure, decompose or modify the photo reactive composition, and developing and rinsing the exposed layer.

A contact screen used for the photopolymerizable composition is a negative type screen composed of transparent dot pattern aligned in a black opaque background. Each of the transparent dots has percent transmission gradually decreasing outwardly from the center of the dot. By light exposing through the contact screen, the layer of the photopolymerizable composition is exposed dot wise such that an exposure amount decreases outwardly from the center of the dot.

For the photodecomposable composition, on the other hand, a positive type contact screen is used, which is composed of black dot pattern aligned in a transparent background. Each of the black dots has percent transmission gradually increasing outwardly from the center of the dot. By light exposing through the contact screen, the layer of the photodecomposable composition is exposed dot wise such that an exposure amount increases outwardly from the center of the dot.

Figure 2:
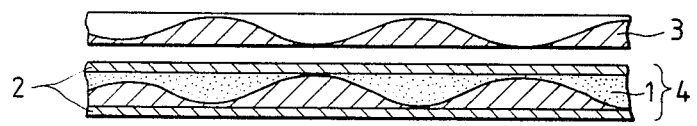
FIG. 2 shows the state of the photopolymerizable sheet after light exposure.
Figure 3:
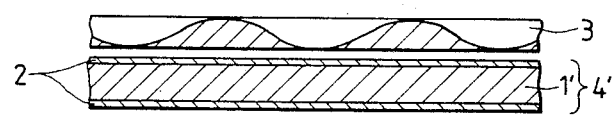
FIG. 3 shows a photodecomposable sheet with a contact screen prior to light exposure.
Figure 4:
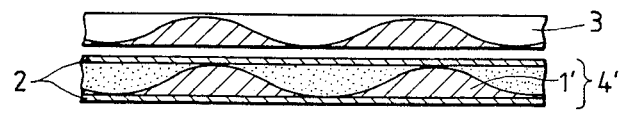
FIG. 4 shows the state of the photodecomposable sheet after light exposure.

In FIGS. 1 and 3, the percent transmission of contact screen 3 varies corresponding to a sine curve in the direction of dot's diameter, so that the layer of photopolymerizable composition 1 or photodecomposable composition 1' is cured or decomposed in an extent corresponding to the light amount through the dot pattern, i.e., thickly cured or decomposed at the areas corresponding to high percent transmission areas in the dot pattern and thinly cured or decomposed at the areas corresponding to low percent transmission areas, as shown in FIGS. 2 and 4. An interval of lenses to form, and size and thickness of a lens can be easily changed merely by adjusting the exposure amount of light to irradiate the contact screen. The contact screen has a thickness generally ranging from 150 to 300 μm. Further, any dot shape is available such as circular and polygonal shape. Among these, circular dot shape is preferable.

Any light source can be used in the present invention as long as it can cure the photopolymerizable composition or decompose the photodecomposable composition. For example, a xenon lamp, an arc lamp, and a mercury lamp can be used. Light exposure is conducted at selected light irradiation amount and light applying period, those capable of curing the photopolymerizable composition and of softening the photodecomposable composition.

The thus light exposed photopolymerizable sheet 4 or photodecomposable sheet 4' is then subjected to development and rinsing in a conventional manner, whereby a microlens of the present invention can be obtained.

The present invention is now explained in more detail by reference to the following Examples, but the present invention is not construed as being limited thereto.

EXAMPLE 1

Ten parts by weight of polymethyl methacrylate (PMMA) was dissolved in 200 parts by weight of methyl ethyl ketone on a hot plate or water bath at a temperature of 60° to 80° C. On the other hand, 60 parts by weight of a low viscosity photopolymerizable monomer, 2 hydroxy 3 phenoxypropyl acrylate, was mixed with 5 parts by weight of a photopolymerization initiator, 2,2 dimethoxy 2 phenylacetophenone, at room temperature. After cooling the PMMA solution to room temperature, the mixture of the monomer and the initiator was added thereto to obtain a photopolymerizable composition 1.

The composition was coated in a thickness of 10 to 50 $\mu$m on a 25 $\mu$m-thick PET film 2 with a wire bar, which was then covered with another 25 $\mu$m-thick PET film 2 to sandwich the layer of the photopolymerizable composition. The thus prepared photopolymerizable sheet 4 was brought into contact with a contact screen 3 having a negative dot pattern, and light was irradiated to the contact screen 3 for about 5 seconds using a xenon lamp, whereby the layer of the photopolymerizable composition 1 thereunder was cured in the dot pattern. The light exposed sheet was then subjected to development for 45 to 60 seconds in developer and rinsing for 1 minute to obtain a colorless transparent microlens.

EXAMPLE 2

Ten parts by weight of a polyester resin was dissolved in 200 parts by weight of methyl ethyl ketone on a hot plate or water bath at a temperature of 60° to 80° C., and 80 parts by weight of a methacryloyl chloride/methyl methacrylate copolymer was further mixed thereto to prepare a photodecomposable composition 1'.

Using the composition, the same procedure as in Example 1 was repeated to obtain a photodecomposable sheet 4', which was then subjected to a heat treatment thereby to form a crosslinking structure between molecules in the photodecomposable composition, making insoluble in a solvent. Subsequently, the sheet 4' was exposed to light through a contact screen 3 having a positive dot pattern in the same manner as in Example 1. The light exposed sheet was then developed for 45 to 60 seconds in developer and rinsed for 1 minute, whereby a colorless transparent microlens was obtained.

EXAMPLE 3

The same procedure as in Example 2 was repeated, excepted that an epoxy resin was used as a film forming resin in place of the polyester resin. As a result, a microlens having good properties was obtained, as well as that obtained in Example 2.

A microlens for transmitting image information on a curved surface was also obtained by shaping the photodecomposable sheet 4' in conformity with the curved surface and bringing the contact screen 3 into contact with the most convexed portion of the shaped sheet, followed by light exposure, development and rinsing.

Since use of the photo reactive composition makes it possible to form a plane lens array, the microlens of the present invention can transmit image information on an entire surface of the original. Further, anisotropy and thickness of the lens can be freely changed, so that image information on a curved surface can be transmitted. Furthermore, in accordance with the present invention a microlens of any size can be formed on a plane, and because of its pliability the lens can be shaped into any form.

What is claimed is:

1. A process for producing a microlens which comprises exposing a layer of a photo reactive composition selected from (i) compositions containing a photopolymerizable monomer and a photopolymerization initiator or (ii) compositions containing a photodecomposable polymer to light through a contact screen, said contact screen having a light transmittance which is changed in a predetermined direction such that the photo reactive composition photoreacts with the light to have an intensity distribution corresponding to the change in the light transmittance of the contact screen; and developing and rinsing the light exposed layer.

2. A process as claimed in claim 1, wherein said photo reactive composition is a composition containing a photopolymerizable monomer and a photopolymerization initiator.

3. A process as claimed in claim 1, wherein said photo reactive composition is a composition containing a photodecomposable polymer.

* * * * *